United States Patent [19]
Desaulniers

[11] Patent Number: 5,647,973
[45] Date of Patent: Jul. 15, 1997

[54] REVERSE OSMOSIS FILTRATION SYSTEM WITH CONCENTRATE RECYCLING CONTROLLED BY UPSTREAM CONDUCTIVITY

[75] Inventor: Jerry W. Desaulniers, Montreal, Canada

[73] Assignee: Master Flo Technology Inc., Brossard, Canada

[21] Appl. No.: 561,924

[22] Filed: Nov. 22, 1995

Related U.S. Application Data

[63] Continuation of Ser. No. 236,100, May 2, 1994, abandoned.

[51] Int. Cl.$^6$ .................................................. B01D 61/12
[52] U.S. Cl. .................... 210/96.2; 210/195.2; 210/257.2
[58] Field of Search ........................... 210/96.2, 195.2, 210/257.2, 259, 340, 341, 650, 652, 805, 85, 96.1

[56] References Cited

U.S. PATENT DOCUMENTS

| | | | |
|---|---|---|---|
| 4,773,991 | 9/1988 | Aid | 210/195.2 |
| 4,784,771 | 11/1988 | Wathen et al. | 210/195.2 |
| 5,076,913 | 12/1991 | Miller et al. | 210/195.2 |
| 5,244,579 | 9/1993 | Horner et al. | 210/195.2 |

FOREIGN PATENT DOCUMENTS

| | | | |
|---|---|---|---|
| 3106772 | 9/1982 | Germany | 210/652 |

*Primary Examiner*—Joseph W. Drodge
*Attorney, Agent, or Firm*—Eric Fincham

[57] ABSTRACT

A filtration system comprising a reverse osmosis unit having an inlet thereto, a permeate outlet and a concentrate outlet wherein a first conduit extends from a source upstream of the reverse osmosis unit to the liquid inlet, a second conduit extends from the concentrate outlet wherein a flow control mechanism controls the amount of concentrate flow to the third and fourth conduits, the third conduit being connected to the first conduit while a conductivity sensor on the first conduit is mounted downstream of a point where the third conduit connects to the first conduit, the conductivity sensor being connected to the flow control mechanism to control the amounts of concentrate which are directed to the third and fourth conduits in accordance with the conductivity of the liquid. The arrangement allows one to approximate a measure of the total dissolved solid and thereby maximize the efficiency of the system and avoid unnecessary dumping of liquid to a drain.

4 Claims, 1 Drawing Sheet

REVERSE OSMOSIS FILTRATION SYSTEM WITH CONCENTRATE RECYCLING CONTROLLED BY UPSTREAM CONDUCTIVITY

This is a continuation of application Ser. No. 08/236,100 filed May 2, 1994, now abandoned.

BACKGROUND OF THE INVENTION

The present invention relates to filtration systems and more particularly, to industrial filtration systems using reverse osmosis units.

The use of reverse osmosis systems is well known in the art. These systems are used in the production of potable water from sea water and in industrial operations to produce high quality water for specialized purposes such as boiler makeup, use in printing presses, semi conductor manufacture, and in pharmaceuticals and in various other industries. It is known that reverse osmosis systems can produce water having low levels of suspended and total dissolved solids.

In the operation of reverse osmosis systems, the input liquid is divided into two output streams—a permeate stream which is substantially free of the dissolved substance and a concentrate stream which contains the majority of the substance to be removed. Reverse osmosis systems utilize a semi-permeable membrane with the input stream being fed at a pressure substantially above the osmotic pressure of the feed solution. When it is fed across the membrane, water molecules preferentially pass through the membrane with a very limited amount of the dissolved substances also passing through the membrane, depending upon the type of membrane and operation of the system.

In many industrial operations, a portion of the concentrate stream is recycled back to the input. The reason for this is that reverse osmosis systems are not efficient enough to concentrate the undesirable product to a sufficient extent to merely discharge the concentrate stream to drain unless one is dealing with an unlimited supply of water and does not have problems in discharging the concentrate—e.g. a desalination. In a typical industrial plant, one must minimize the discharge of water which typically goes to drain, both for pollution control purposes and to minimize use of water.

To overcome the above, most reverse osmosis systems used for industrial purposes operate in a manner so as to fix a predetermined amount of the concentrate which is recycled back to the inlet. While this does reduce the amount of water discharged, inherently it becomes an inefficient system since one must err on the side of safety and not discharge more than one is certain will not result in contamination of the permeate stream. Typically, systems recycle approximately 75% of their concentrate stream back to the inlet.

It is an object of the present invention to provide a reverse osmosis system which minimizes the amount of liquid discharged to the drain.

It is a further object of the present invention to provide a reverse osmosis system which automatically functions to provide maximum efficiency in the removal of unwanted material from the liquid being treated.

SUMMARY OF THE INVENTION

According to one aspect of the present invention, there is provided a filtration system comprising a reverse osmosis device having a liquid inlet, a permeate outlet and a concentrate outlet, a first conduit extending from a supply source of the liquid to be treated to said liquid inlet, a second conduit extending from said concentrate outlet, a flow control means mounted on said second conduit adapted to direct the concentrate in a variable proportion between third and fourth conduits, said third conduit being connected to said first conduit, conductivity sensor means on said first conduit downstream of said connection of said third and first conduits, said conductivity sensor means being operatively connected to said flow control means to control the amount of concentrate flowing through said first conduit dependant upon the measurement of conductivity.

The system, as described hereinbelow, will be described with respect to an industrial type system and more particularly a system which is suitable for use in an industry such as printing wherein the inlet fluid is water and it is desired to remove contaminants therefrom. It will be understood that the system may be adapted for other requirements.

In a printing operation, a great deal of water is utilized and this water must meet certain requirements for suspended solids and total dissolved solids. The invention will typically be used in an overall system wherein the water will first be fed from a source thereof and passed through suitable mechanical filters to remove sediment and also to soften the water. Thus, suitable carbon and/or other types of filters having backwash capabilities may be employed.

Subsequently, the water may then be passed to one or more reverse osmosis devices. The reverse osmosis devices may be any conventional such as are known in the art and each device would include a liquid inlet along with outlets for the concentrate and the permeate. It will be understood that one may employ one or several such devices either in series or in parallel. Typically, for feeding to the system, a booster pump is employed to generate the pressure required for functioning of the reverse osmosis device. As stated above, these devices function using a semi-permeable membrane with the fluid to be treated pressurized to a pressure above the osmotic pressure of the feed solution.

The permeate, after discharge from the reverse osmosis device or devices, may either go directly to its use or alternatively, be directed to a storage tank. The concentrate, as previously mentioned, has a portion thereof recycled back to the inlet of the reverse osmosis device. The proportion of the concentrate sent back will depend upon the application and the purity of the original inlet water. Typically, in prior art systems, this proportion is set at a fixed ratio which ratio must necessarily be on the low side for safety purposes.

According to the present invention, the concentrate is fed to a metering device which preferably comprises a three way control valve with the first line from the control valve leading to a drain or a further treatment and the second line being the recycling line which will lead back to the input of the reverse osmosis device.

The system provides means for measuring the total dissolved solids prior to entry into the reverse osmosis unit. To continually monitor the total dissolved solids is difficult from a practical point of view; a very good approximation may be had by using a conductivity sensor. Thus, according to the preferred aspect of the invention a conductivity sensor is mounted on the input line to the reverse osmosis unit at a point downstream of where the recycling of the concentrate enters the line. Thus, there is provided a continuous measurement of the total dissolved solids entering the reverse osmosis unit.

When the total dissolved solids exceeds a desired limit, the three way valve is actuated to dump more of the concentrate to drain and permit less to recycle to the reverse osmosis unit.

BRIEF DESCRIPTION OF THE DRAWING

Having thus generally described the invention, reference will be made to the accompanying drawing illustrating an embodiment thereof, in which.

DESCRIPTION OF THE PREFERRED EMBODIMENTS

Figure 1:
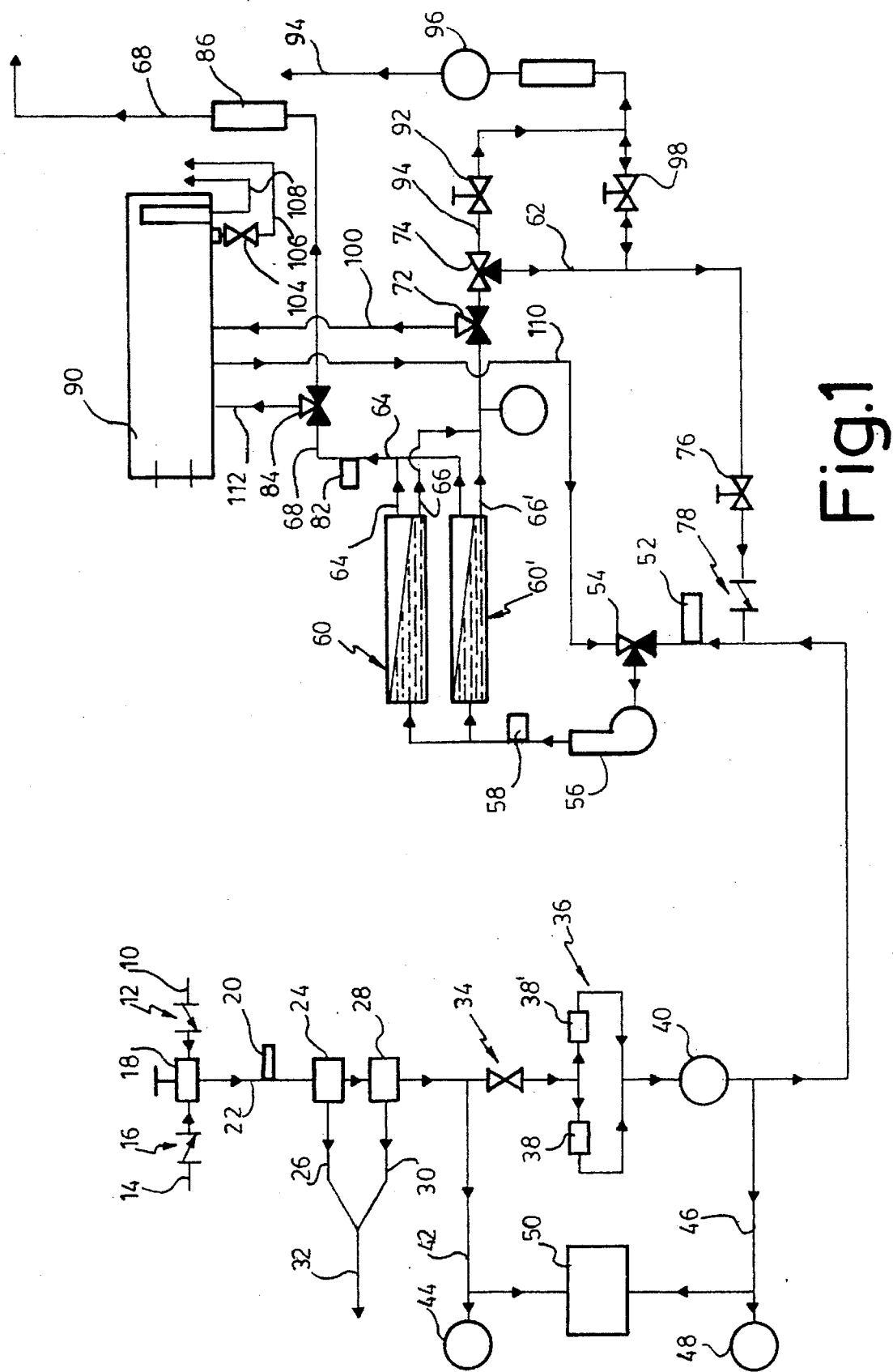
FIG. 1 is a schematic view of an operation of a filtration system according to the present invention.

Referring to the drawings in greater detail, the system illustrated is one which might be utilized in an industrial plant wherein new input water is fed into a system.

In the illustrated embodiment, there is provided a cold water inlet 10 controlled by a suitable valve 12 and a hot water inlet 14 having valve 16 associated therewith. A blending valve 18 provides the desired temperature water and is responsive to a temperature sensor 20. The blend of water is then fed through inlet line 22.

Typically, the inlet line will feed the water to a carbon filter 24 having a backwash line 26 and then to a water softener 28 also having a back wash line 30. Lines 26 and 30 are connected to a suitable drain line 32 for discharge.

The system includes a normally closed solenoid 34 on line 22; a filter assembly 36 includes a pair of suitable filter members 38. A flow meter 40 is incorporated on line 22.

A take off line 42 is connected to a pre-sediment gauge 44 while a further takeoff line 46, downstream from the filter assembly 36, has a post sediment gauge 48. Located between the two is a differential pressure switch 50. Pressure switch 50 is designed to set the difference in pressure between gauges 44 and 48 and if the pressure is excessive, it may shut down the system to indicate a need for replacement of filter assembly 36.

A conductivity sensor 52 is mounted on line 22 and measures the conductivity of the water and utilizes this measurement as a correlation to the total dissolved solids in the input water. A three way valve 54 is mounted on line 22 and from there the water is fed to a booster pump 56 which is operatively connected to a pressure switch 58 to maintain the required pressure going into the reverse osmosis process.

In the illustrated embodiment, a pair of reverse osmosis units 60 and 65 are provided. From these units, there is a permeate outlet 64, 64' and a concentrate outlet 66, 66'. Permeate outlets 64 and 64' connect to a permeate line 68. Concentrate outlets 66 and 66' are connected to a concentrate line 62 which has a system pressure gauge 70 incorporated thereon. Concentrate line 62 then feeds through first and second three way valves 72 and 74 respectively. Line 62, after exiting valve 74, is connected to valve 76 and check valve 78 thereon before being connected to inlet line 22. Permeate line 68 has a conductivity sensor 82 and is then connected to a three way valve 84. Permeate would conventionally be fed through a flow meter 86 to the required use of the permeate water and/or to a holding tank arrangement.

Associated with three way valve 72 is a line 100 which feeds to a clean in place tank 90 which functions as a concentrate manifold. Clean in place tank 90 includes an overflow structure 102 and a further outlet connected to a normally closed solenoid 104. Lines 106 and 108 exit to the drain. Clean and place tank 90 also has an outlet 110 which can feed concentrate to three way valve 54 when the supply through line 62 is not sufficient.

Discharge line 94 from three way valve 74 is connected to a drain line and includes there on valves 92 and 98 along with a suitable flow meter 96.

In operation, the system functions such that concentrate is normally recycled by means of line 62 to inlet line 22. The proportion which is recycled is controlled by conductivity sensor 52 which functions to continually measure the conductivity of the inlet water to maximize the amount of concentrate returned to the reverse osmosis units 60 and 60'.

Conductivity sensor 82 is provided as a safety measure in case of a whole or other breakdown of the membrane within reverse osmosis units 60 and 60'. Thus, too high a measurement indicating higher than acceptable total dissolved solids, then the permeate may alternately be forwarded to clean in place tank 90 through valve 84 and line 112. Similarly, should the system be operating such that further concentrate is required, this may be taken in via line 110 from clean in place tank 90 through valve 54 to be recycled to the reverse osmosis units 60 and 60'.

It will be understood that the above described embodiments are for purposes of illustration only and that changes and modification may be made thereto without departing from the spirit and scope of the invention.

What is claimed is:

1. A filtration system for a liquid comprising a reverse osmosis unit, a liquid inlet thereto, a permeate outlet and a concentrate outlet, first, second, third and fourth conduits, said reverse osmosis unit constructed and arranged to divide said liquid into a first permeate stream passed through said permeate outlet and a second concentrate stream passed through said concentrate outlet said first conduit extending from a source of liquid upstream of said reverse osmosis unit to said liquid inlet, said second conduit extending from said concentrate outlet to a flow control means adapted to control respective amounts of concentrate flow to said third and fourth conduits, said third conduit being connected to said first conduit, conductivity sensor means on said first conduit to sense conductivity of liquid flowing therethrough, said conductivity sensor means being mounted downstream of a point where said third conduit connects with said first conduit, said sensor means being operatively connected to said flow control means such that amounts of concentrate directed to said third and fourth conduits may be varied in accordance with measurements of said conductivity sensor means.

2. The system of claim 1 further including fifth conduit means extending from said permeate outlet to a storage tank, second conductivity sensor means on said fifth conduit, said second conductivity sensor means also being operatively connected to said flow control means.

3. The system of claim 1 further including a drain manifold operatively connected to said fourth conduit and conduit means extending between said fourth conduit and said first conduit.

4. The system of claim 1 further including mechanical filter means on said first conduit.

* * * * *